June 17, 1952  F. C. HUNGERFORD  2,600,773
FISH LANDING NET
Filed June 27, 1950
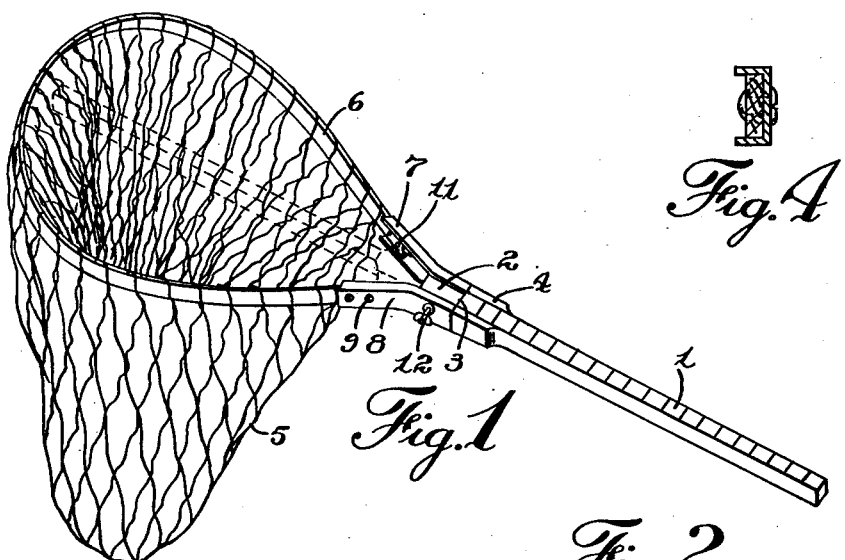
Fig.1
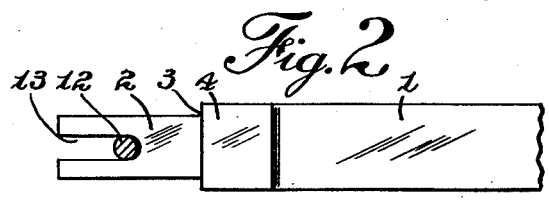
Fig.4
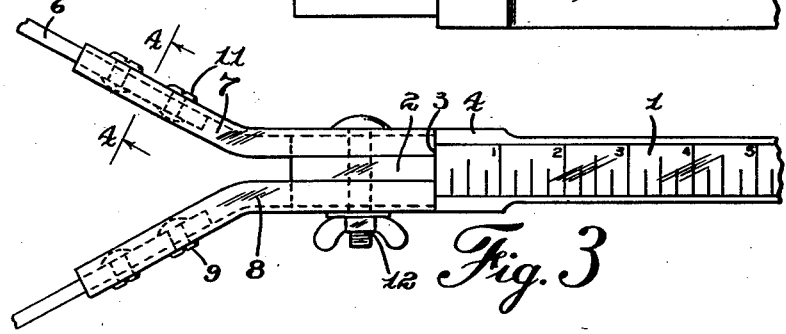
Fig.2
Fig.3
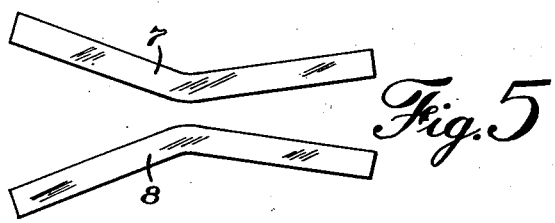
Fig.5
WITNESS:
INVENTOR.
Fred C. Hungerford
BY
ATTORNEY Patented June 17, 1952

2,600,773

UNITED STATES PATENT OFFICE 2,600,773

FISH LANDING NET

Fred C. Hungerford, Horseheads, N. Y.

Application June 27, 1950, Serial No. 170,652

3 Claims. (Cl. 43—12)

The present invention relates to a fish landing net and more particularly to that type of hand net which is adaptable for use by fishermen for capturing fish which have been hooked and brought within reach of the angler.

It is an object of the present invention to provide a novel landing net which is adequate in size, simple in construction, strong and light, and conveniently portable in confined spaces such as the trunk of a car.

It is another object to provide such a device comprising a hoop or bail and a handle, in which the attachment of the bail to the handle is rigid and strongly reinforced so as to avoid a weakness in the structure at this location.

It is another object to provide such a device in which the attachment between the bail and handle is reversible so as to enable the handle to be secured in either extended or folded relation to the net.

It is another object to provide such a device in which the means for connecting the bail to the handle are so constituted that they operate to spread the sides of the bail and prevent its becoming elongated and narrow from fatigue of the material or for other reasons.

It is another object to provide such a device in which the bail and its attaching means are rigid as respects forces transverse to the plane of the bail, while causing very little resistance to movement in the water in such direction.

Further objects and advantages will be apparent from the following description taken in connection with the accompanying drawing in which:

Fig. 1 is a perspective view of a preferred embodiment of the invention;

Fig. 2 is an enlarged detail of a part of the handle showing the attaching portion thereof in side elevation;

Fig. 3 is a plan view of the joint between the bail and handle of the net;

Fig. 4 is a section taken substantially on the line 4—4 of Fig. 3; and

Fig. 5 is a detail of the channel members used for connecting the bail to the handle.

In Fig. 1 of the drawing there is illustrated a handle 1 of suitable material such as ash or hickory wood, and having an attaching portion 2 which is rectangular in cross section, as also illustrated in Fig. 2, and which is preferably defined by a shoulder 3 formed by an enlargement 4 of the handle. A net 5 formed of suitable material such as water repellent cord so tied as to provide the desired mesh for the purpose in view, is laced at its rim around a bail 6 formed from a strip of pliable material such as oak, ash or hickory wood of rectangular cross section, the long dimension of which is the same as the short dimension of the attaching portion 2 of the handle 1. The bail is bent in the form of a loop or hoop, and a pair of connecting members 7, 8 in the form of bars of channel cross-section are rigidly attached to the ends of the bail as indicated at 9 and 11. The connecting members are so dimensioned that the channel conforms closely to the ends of the bail as shown in Figs. 3 and 4, whereby a very firm and secure attachment is made thereto.

The free ends of the connecting members are joined by a clamp bolt 12 which traverses registering openings in said end portions and is provided with a wing-nut or other suitable means for providing ready manual adjustment of the bolt. The attaching portion 2 of the handle 1 is provided with a transverse opening or slot 13 extending from the end thereof to substantially the middle of said portion, the slot being arranged to slidably receive the clamp bolt 12 as shown in Fig. 2 while the attaching portion 2 is of such thickness and length as to fit snugly within the channels of the connecting members 7, 8. The ends of the latter are seated against the shoulder 3 of the handle as shown in Fig. 4 when the clamp bolt is at the bottom of the slot 13.

The connecting members 7, 8 are bent divergently at their middle portions as best shown in Fig. 5, the angle of such bend being so chosen that when the free ends of the connecting members are clamped together as shown in Fig. 3, the ends of the bail 6 are bent outwardly so as to form the desired shape for the rim of the net.

When it is desired to use the net, the clamp bolt 12 is loosened and the handle slid between the channeled connecting members 7, 8 until the ends thereof rest against the shoulder 3, whereupon the clamp bolt is tightened and the net thus rigidly assembled. In use the joint between the handle and bail formed by the connecting members forms a firm and rigid connection with the bail 6 without imposing localized bending stresses on the bail. Moreover, the open construction of the joint presents very little resistance to the passage thereof through the water as will be appreciated by an examination of Fig. 3, whereby the net may be forced rapidly through the water when necessary to quickly retrieve a fish.

When it is desired to transport the net, the clamp bolt 12 is loosened and the handle retracted from the connecting members 7, 8 and reinserted in reverse position as shown in dotted lines in Fig 1. In this position a net of the largest size convenient for manual operation may be readily stored in a comparatively small space such as the trunk of an automobile.

The straight form of the handle with a flat upper surface forms a convenient location for a scale for measuring the length of fish secured, as shown in Fig. 3.

Although but one embodiment of the invention has been shown and described in detail it will be understood that other embodiments are possible and that changes may be made in the precise design and arrangement of the parts without departing from the scope of the invention.

What is claimed is:

1. In a fish landing net, a handle having an attaching portion of substantially uniform rectangular cross-section, a bail in the form of an open loop, the ends of which are rectangular in cross-section and the long dimension of which is the same as the short dimension of the attaching portion of the handle, a net attached to the bail, a pair of connecting members in the form of channel beams of uniform cross-section fitting closely around the ends of the bail, rigidly fixed thereto and slidably embracing the attaching portion of the handle, and means for detachably clamping the two channel members on the handle.

2. A fish landing net as set forth in claim 1 in which said connecting members are bent outwardly adjacent the middle portion thereof, so that when they are clamped to the handle with their free ends in parallel relation, they bend outwardly the ends of the bail and widen the loop formed thereby.

3. A fish landing net as set forth in claim 1 in which the attaching portion of the handle is provided with a transverse slot extending from substantially the middle portion thereof to its outer end, and the means for detachably clamping the two channel members on the handle comprises a bolt traversing the channel members and said slot so that when the clamping bolt is loosened, the handle may be slipped between the free ends of the channel members in either extended or folded relation to the bail, without removing the bolt.

FRED C. HUNGERFORD.

REFERENCES CITED

The following references are of record in the file of this patent:

UNITED STATES PATENTS

| Number | Name | Date |
| --- | --- | --- |
| 1,957,944 | Dexter | May 8, 1934 |
| 2,205,706 | Wolff | June 25, 1940 |
| 2,422,510 | Ward | June 17, 1947 |